(12) United States Patent
Pratt et al.

(10) Patent No.: US 11,783,996 B2
(45) Date of Patent: Oct. 10, 2023

(54) TRANSFORMER POWER MANAGEMENT CONTROLLERS AND TRANSFORMER POWER MANAGEMENT METHODS

(71) Applicant: Battelle Memorial Institute, Richland, WA (US)

(72) Inventors: Richard M. Pratt, Richland, WA (US); Michael CW Kintner-Meyer, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 348 days.

(21) Appl. No.: 16/001,465

(22) Filed: Jun. 6, 2018

(65) Prior Publication Data

US 2019/0378648 A1 Dec. 12, 2019

(51) Int. Cl.
*H01F 27/40* (2006.01)
*H02H 7/04* (2006.01)
*H02P 13/06* (2006.01)
*G05F 1/14* (2006.01)

(52) U.S. Cl.
CPC .............. *H01F 27/402* (2013.01); *G05F 1/14* (2013.01); *H02H 7/04* (2013.01); *H02P 13/06* (2013.01); *H01F 2027/406* (2013.01)

(58) Field of Classification Search
None
See application file for complete search history.

(56) References Cited

U.S. PATENT DOCUMENTS

| 4,654,806 | A | * | 3/1987 | Poyser | H02H 7/04 |
|---|---|---|---|---|---|
| | | | | | 324/726 |
| 7,010,363 | B2 | | 3/2006 | Donnelly et al. | |
| 7,149,605 | B2 | | 12/2006 | Chassin et al. | |
| 7,218,998 | B1 | * | 5/2007 | Neale | H02J 3/14 |
| | | | | | 700/295 |
| 7,701,357 | B2 | | 4/2010 | Deaver et al. | |
| 8,258,761 | B2 | | 9/2012 | Hammerstrom | |
| 8,558,511 | B2 | | 10/2013 | Hammerstrom | |
| 8,590,802 | B2 | | 11/2013 | Hammerstrom | |

(Continued)

OTHER PUBLICATIONS

The Illustrated Dictionary of Electronics 160 (Stan Gibilisco ed., 8th ed. 2001) ("Gibilisco Electronics Dictionary").*

(Continued)

*Primary Examiner* — Mohammad Ali
*Assistant Examiner* — David Earl Ogg
(74) *Attorney, Agent, or Firm* — Wells St. John P.S.

(57) ABSTRACT

Transformer power management controllers and transformer power management methods are described. According to one aspect, a transformer power management controller includes processing circuitry configured to monitor an electrical characteristic of electrical energy which is received from a secondary of a transformer of an electric power system, use the monitored electrical characteristic to determine transformer loading information which is indicative of an amount of power which is being supplied by the secondary of the transformer to a plurality of loads which are coupled with the secondary of the transformer, and use the transformer loading information to adjust an amount of the electrical energy which is supplied by the secondary of the transformer to at least one of the loads which is coupled with the secondary of the transformer.

19 Claims, 3 Drawing Sheets

(56) References Cited

U.S. PATENT DOCUMENTS

| | | | | |
|---|---|---|---|---|
| 2002/0109507 | A1* | 8/2002 | Khalin | G01R 31/027 324/547 |
| 2002/0161558 | A1* | 10/2002 | Georges | G05B 23/0245 702/189 |
| 2011/0133693 | A1* | 6/2011 | Lowenthal | B60L 11/1824 320/109 |
| 2011/0251732 | A1* | 10/2011 | Schweitzer, III | H02J 3/12 700/297 |
| 2012/0109389 | A1* | 5/2012 | Covaro | H02S 40/32 700/287 |
| 2013/0046411 | A1 | 2/2013 | Al Faruque et al. | |
| 2014/0297206 | A1* | 10/2014 | Silverman | G01R 22/063 702/58 |

OTHER PUBLICATIONS

The American Heritage Dictionary of the English Language 1382 (4th ed. 2006).*

Academic Press Dictionary of Science and Technology 2009 (Christopher Morris ed., 1992).*

The Linear Approximation (Jan. 7, 2001), at http://www.math.pitt.edu/~sparling/23012/23012derapp1/node7.html (last visited Nov. 2, 2022).*

Laplante Engineering Dictionary at 278.*

"Unit 14: Transformers", available online at http://css.wsu.edu/wp-content/uploads/2012/09/Transformers1.pdf, May 16, 2018, pp. 273-295 and 316.

Ardakanian et al., "Distributed Control of Electric Vehicle Charging", e-Energy, May 21-24, 2013, United States, 12 pages.

De Keulenaer et al., "The Scope for Energy Saving in the EU Through the Use of Energy-Efficient Electricity Distribution Transformers", Institution of Engineering and Technology, 2001, United Kingdom, 6 pages.

DTE Energy, "Transformer Impedances", available online at https://www2.dteenergy.com/wps/portal/dte/bizBuild/buildersContractors/details/electric%20service/transformer%20impedances, Sep. 17, 2012, 3 pages.

Dubey et al., "Electric Vehicle Charging on Residential Distribution Systems: Impacts and Mitigations", IEEE Access vol. 3, Sep. 14, 2015, United States, pp. 1871-1893.

Jardini et al., "Distribution Transformer Loading Evaluation Based on Load Profiles Measurements", IEEE Transactions on Power Delivery vol. 12, No. 4, Oct. 1997, Brasil, pp. 1766-1770.

McLyman, "Transformer and Inductor Design Handbook", Third Edition, Revised and Expanded, Marcel Dekker, Inc., 2004, United States, 533 pages.

Moghbel et al., "Decentralize Coordinated Charging of Plug-In Electric Vehicles in Unbalanced Residential Networks to Control Distribution Transformer Loading, Voltage Profile and Current Unbalance", Intelligent Industrial Systems, 2015, Germany, pp. 141-151.

Motion Laboratories, Inc., "Transformer Basics Information Guide", available online at https://www.motionlabs.com/wp-content/uploads/Transformer-Guide.pdf, 2014, United States, 14 pages.

Perez, "Fundamental Principles of Transformer Thermal Loading and Protection", IEEE Texas A&M Relay Conference, 2010, United States, 14 pages.

Power Partners Inc., "Single Phase Overhead Distribution Transformers", PDL 46-200, available online at http://www.powerpartners-usa.com/wp-content/uploads/2016/01/single-phase_product_spec_shett.pdf?x30412, 2009, 2 pages.

Power Quality World, "ANSI C84.1 Electric Power Systems and Equipment—Voltage Ranges", Power Quality in Electrical Systems, available online at http://www.powerqualityworld.com/2011/04/ansi-c84-1-voltage-ratings-60-hertz.html, Apr. 2, 2011, 4 pages.

Rutherford et al., "The Impact of Electric Vehicle Battery Charging on Distribution Transformers", IEEE Applied Power Electronics Conference and Exposition (APEC), Mar. 6-11, 2011, United States, pp. 369-400.

Sichau et al., "Short Circuit Fault Calculations", from Design, Operation and Maintenance, Chapter 10, US Forest Service Region 6, available online at https://www.fs.fed.us/database/acad/elec/greenbook/10_shortcalc.pdf, Jun. 14, 2002, 10 pages.

* cited by examiner

TRANSFORMER POWER MANAGEMENT CONTROLLERS AND TRANSFORMER POWER MANAGEMENT METHODS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to transformer power management controllers and computer-implemented transformer power management methods.

BACKGROUND OF THE DISCLOSURE

A transformer is an electric device including two or more windings, wound on a common core, which by an electromagnetic induction coupling transfers electric energy from one set of windings (primary) to another set of windings (secondary). While the voltage and current usually change (from primary to secondary), the frequency of the alternating current energy remains unchanged. The voltage change is determined by the ratio of turns of wire around the core, between the primary and secondary windings.

Transformers are often used in transmission and distribution systems of an electrical power grid and other applications to modify the voltages of the electricity being delivered to serve the loads of customers. Transformers may be selected from standard sizes to deliver no less than the maximum power needed by the installed loads. Approximately 2% to 5% of the electrical energy is typically lost in a transformer, mostly due to the resistance of the windings and these electrical losses are manifested as thermal energy.

Transformer overloads can occur when transformers are already at 80%-90% of their full nameplate rating and extra capacity is needed, especially during hot summers. Depending on a utility's criteria, transformers may be allowed to be overloaded, while still maintaining transformer integrity, to keep continuity of the load for economical or reliability reasons.

However, these electrical energy losses increase the temperatures of oil and windings of a transformer and if not properly controlled may degrade the dielectric properties of the transformer's insulation leading to premature failure of the transformer. These energy losses have two forms including no-load and load-losses which are created by the transformer core and windings and may generate high temperatures that, if not controlled in a timely manner, can damage the dielectric properties of the insulation. During normal operating conditions, the temperature thermal process is controlled by the cooling system that keeps the transformer in a thermal equilibrium, and it is desired to operate the transformer in accordance with appropriate temperature specifications for longevity of transformer operation.

At least some aspects of the disclosure described below are directed to apparatus and methods which monitor and/or manage the supply of electrical power to one or more loads which are coupled with a transformer. Additional aspects are also discussed below.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Figure 1:
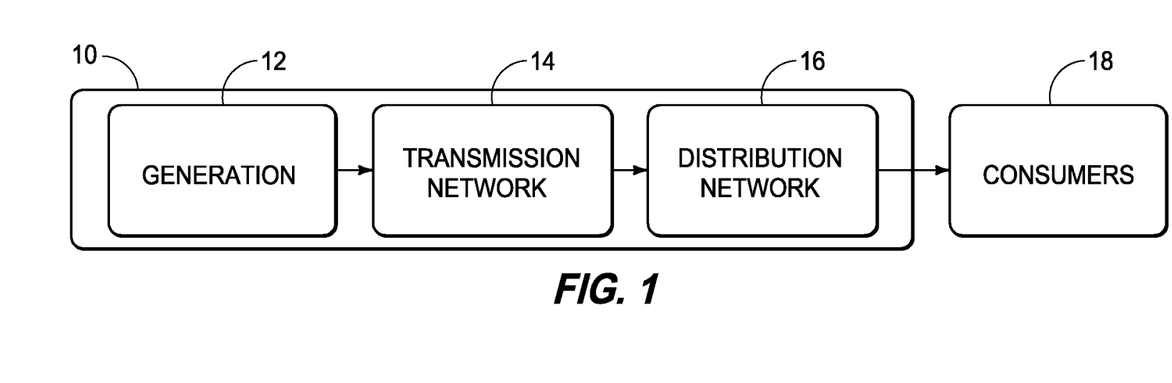
FIG. 1 is a functional block diagram of an electric power system according to one embodiment.

Referring to FIG. 1, an example embodiment of an electric power system 10 is shown. Aspects of the disclosure are discussed below with respect to the electric power system 10 which is implemented as an electric power grid in one example although apparatus and methods of the disclosure may be utilized to monitor and manage loading of transformers in other applications. As discussed in detail below, apparatus and methods monitor electrical energy being supplied by a transformer and control an amount of electrical energy and power which is supplied by the transformer to one or more loads as a result of the monitoring, for example, to maintain the operation of the transformer within its specifications.

The depicted electric power system 10 includes a generation system 12, a transmission network 14, and a distribution network 16. Generation system 12 includes one or more sources of electrical energy, such as one or more power plants, which generate electrical energy which is applied to the transmission network 14 for transmission to the distribution network 16.

The distribution network 16 supplies the electrical energy to consumers 18 for use in powering one or more electrical loads of the consumers, such as electrical water heaters, electric HVAC systems, electric car chargers, etc. One or more electrical characteristic of the electrical energy, such as voltage and frequency, of the electrical energy may vary (e.g., due to changes in generation, load, and tap changer positions) as the electrical energy is distributed through the electric power system 10. In some example embodiments discussed herein, apparatus and methods monitor the electrical energy conducted within the electric power system 10 and control loading of one or more transformers of the electric power system 10 as a result of the monitoring as discussed in detail below.

Figure 2:
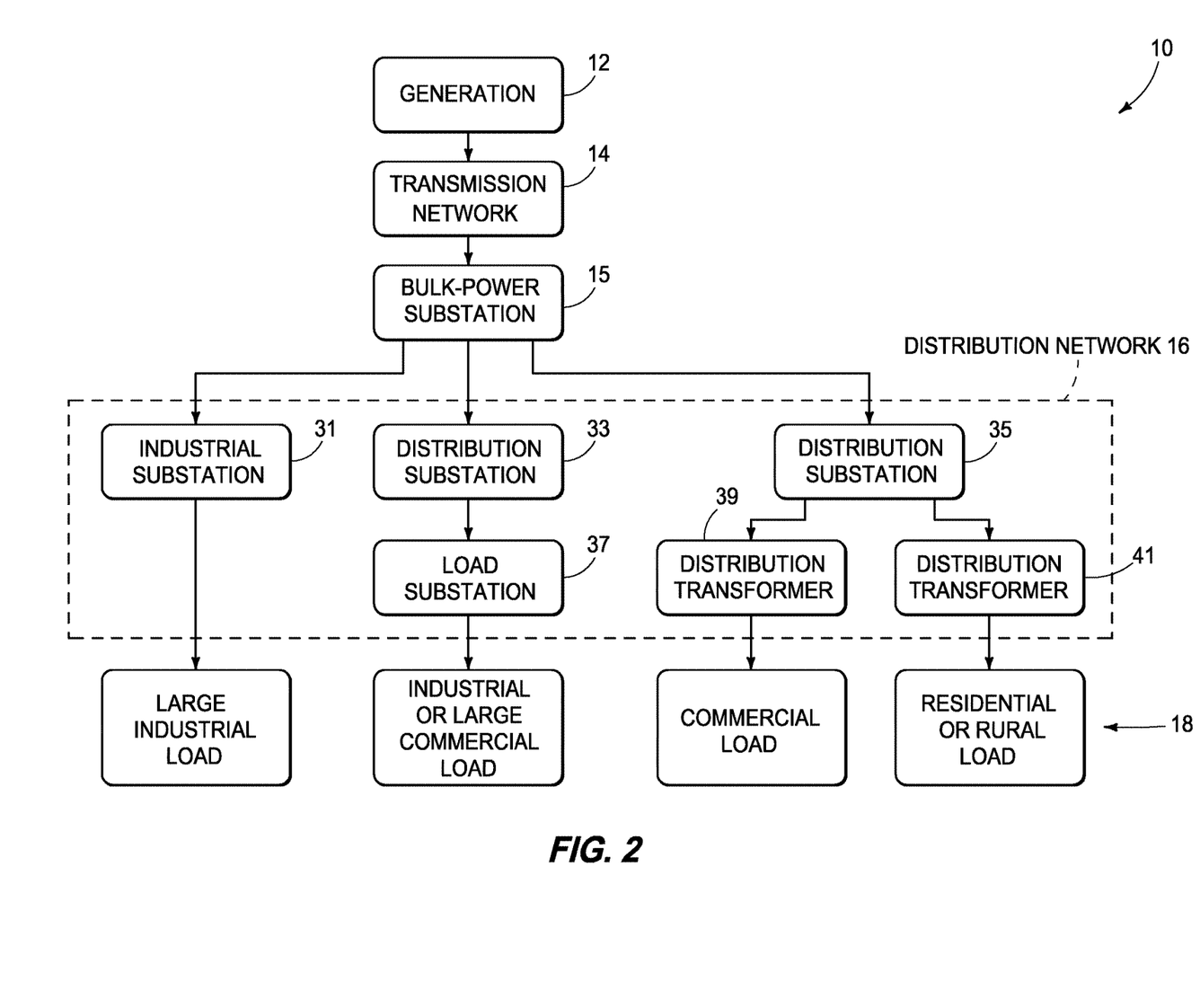
FIG. 2 is a functional block diagram of an electric power system according to one embodiment.

Referring to FIG. 2, additional details regarding one embodiment of electric power system 10 are shown. Generation system 12 supplies electrical energy to transmission network 14 which transmits the electrical energy within an example voltage range of 138-765 kV to bulk-power substation 15 which adjusts the voltage of the electrical energy to 34.5-138 kV for delivery to distribution network 16.

In the depicted example, distribution network 16 includes an industrial substation 31, first distribution substation 33, and second distribution substation 35 which each receive the electrical energy from bulk-power substation 15. Industrial substation 31 adjusts the voltage of the electrical energy to 12.47-13.8 kV for application to large industrial loads 18. Distribution substation 33 adjusts the voltage of the electrical energy to 12.47-34.5 kV for application to load substation 37 which adjusts the voltage of the electrical energy to 480 V-4.16 kV for delivery to industrial or large commercial loads 18. Distribution substation 35 adjusts the voltage of the electrical energy to 4.16-34.5 kV for application to distribution transformers 39, 41. Distribution transformer 39 adjusts the voltage of the electrical energy to 208Y/120V for application to commercial loads 18 and distribution transformer 41 adjusts the voltage of the electrical energy to 120V/240V for application to residential or rural loads 18.

The apparatus and methods described below monitor and/or manage the amount of electrical energy or power supplied to one or more loads which are coupled with the secondary of a transformer within load substation 37, distribution transformer 39 and/or distribution transformer 41.

Figure 2A:
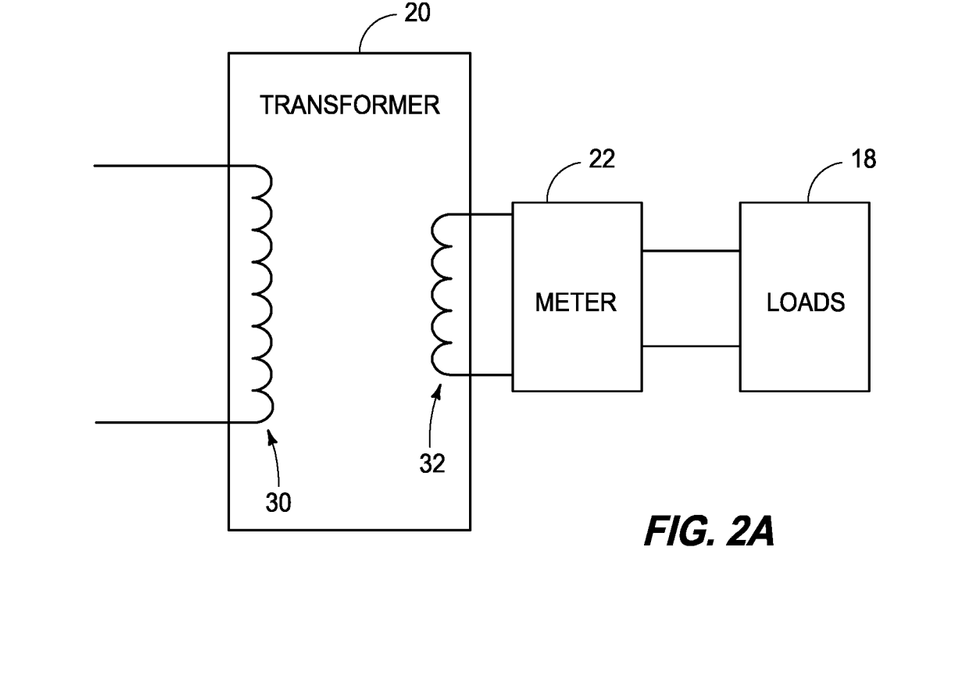
FIG. 2A is an illustrative representation of a transformer implemented within an electric power system according to one embodiment.

Referring to FIG. 2A, a transformer 20 of the electric power system 10 is shown in one example implementation. The illustrated transformer 20 includes a primary winding (or "primary") 30 which receives electrical energy from a source, such one of the distribution substations 33, 35. The transformer modifies an electrical characteristic of the electrical energy, such as voltage, and a secondary winding (or "secondary") 32 of transformer 20 outputs electrical energy at a reduced voltage to one or more loads 18 compared with the voltage of the electrical energy received by the primary 30. As described below, some illustrative aspects are directed to monitoring of the electrical energy outputted from the secondary 32 and control of the loading of transformer 20 as a result of the monitoring.

The transformer secondary 32 is coupled with a meter 22 which monitors and records the amount of electrical energy which has flowed between transformer 20 and the loads 18. An electric utility company or other entity uses information captured by meter 22 for billing and other purposes. Although not shown in FIG. 2, one or more source of electrical energy, such as a photovoltaic source or wind source, may also be coupled with and supply electrical energy to the transformer secondary 32. In one residential example, the loads 18 receiving electrical energy from the secondary 32 may be present within a plurality of different houses.

In addition, the transformer secondary 32 may supply electrical energy at one or more voltages to the loads 18, such as 240 VAC to one or more high-voltage load (e.g., electric vehicle (EV) charging stations, electric water heaters, electric HVAC systems), and 120 VAC to one or more low-voltage loads (e.g., lights, computers, coffee makers).

During the distribution of electrical energy using transformer 20, the primary 30 of transformer 20 receives electrical energy which induces the transformer secondary 32 to conduct electrical energy to meter 22 and loads 18. The voltage of the transformer secondary 32 supplying electrical energy to the loads 18 may be referred to as the line voltage in one embodiment. The line voltage may vary as the loading of the transformer varies (i.e., the number and size of the loads receiving electrical energy from the transformer secondary may vary over time as the loads are switched on and off).

In particular, the voltage of the transformer secondary 32 responds or varies proportionally with the amount of load being powered. An impedance in the windings in the transformer 20 causes the voltage of the electrical energy upon the transformer secondary 32 (i.e., the secondary voltage or line voltage) to drop as the loading of the transformer increases. For example, an electric vehicle (EV) charger may have a load of 6.6 kW and the cycling of the EV charger from off to on may result in the reduction of the line voltage of a 25 kVA transformer by approximately 1.0 VAC. Typical transformer losses increase with transformer loading and may be 95 W at no load and 512 W at full load in one example. Coil losses in the transformer 20 may also increase based upon increases in temperature from 246 W at 25 degrees C. to 512 W at 135 degrees C. and increases in heat may result in further decrease of the line voltage. In one embodiment, it is desired to maintain the line voltage of the transformer secondary 32 within 5 Volts of its designed operational voltage (e.g., maintain the line voltage of a transformer which is designed to output electrical energy having a voltage of 240 VAC at or above 235 VAC during operation).

Transformers typically have a nameplate rating (e.g., value in kVA) which is indicative of an amount of power that the transformer 20 is able to reliably deliver to the loads 18. It is desired to maintain the amount of the load upon the transformer secondary 32 below the nameplate rating to increase the length of service of the transformer 20 prior to failure. Accordingly, aspects of the disclosure discussed below are directed to monitoring the transformer loading (i.e., the amount of power being delivered by the transformer secondary 32 at different moments in time) and control the amount of electrical energy being supplied to one or more controllable loads at the corresponding moments in time as a result of the monitoring to maintain the amount of load being serviced below the nameplate rating.

Controllable loads refer to loads which may be used to implement power management functions herein with respect to the transformer secondary 32. For the controllable loads 18, the amount of electrical energy which is supplied to and utilized by the loads 18 may be controlled at different moments in time, for example, to reduce or shift the amount of load with respect to time which receives electrical energy from the transformer secondary 32 to reduce the loading of the transformer 32 and distribution network as discussed further below.

In more specific examples, the amount of electrical energy which is supplied to the one or more of the controllable loads may be reduced by changing the state of one or more of the loads from an on state to an off state where no power is utilized or by reducing the rate at which the electrical energy is supplied to the one or more of the controllable loads (e.g., reduce the rate of EV charging). The transformer secondary 32 may also deliver electrical energy to non-controllable loads which are not controlled to implement the power management functions herein.

Figure 3:
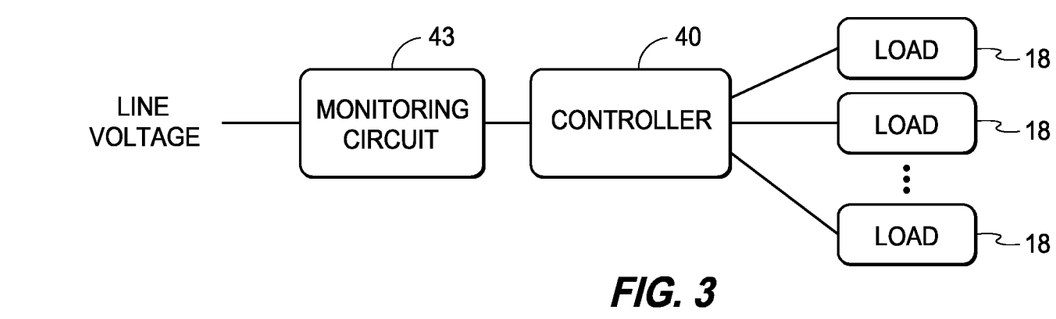
FIG. 3 is a functional block diagram of a controller which is coupled with a monitoring circuit and a plurality of loads according to one embodiment.

Referring to FIG. 3, a transformer power management controller 40 is shown in one example implementation coupled with a monitoring circuit 43 and a plurality of controllable loads 18 which include 120 VAC and 240 VAC residential loads in one example. Controller 40 is configured to monitor electrical energy received via the transformer and process data resulting from the monitoring to control the amount of electrical energy which is supplied to one or more of the controllable loads 18.

Controller 40 may be implemented in different ways in different embodiments. For example, controller 40 may be a standalone unit which is plugged into an electrical outlet of a residence and has communications capabilities to provide control signals to one or more controllable loads 18 to implement power management operations including control of the amount of power consumed by the controllable loads 18. In another example, controller 40 may be implemented within one of the loads 18 and configured to generate and provide control signals to control the power consumption of the individual controllable load 18.

Monitoring circuit 43 is configured to receive electrical energy (e.g., 120 VAC and/or 240 VAC) from the transformer secondary 32, monitor one or more electrical characteristic(s), such as voltage, of the electrical energy upon the transformer secondary 32 and generate a signal or data regarding the monitored electrical characteristic. Monitoring circuit 43 has a 0.5% AC line voltage measurement resolution in one implementation. In addition, monitoring circuit 43 may monitor the line voltage of the transformer secondary directly, using linearly-scaled representative signals of the line voltage, using rectified signals of the line voltage or using filtered versions of the line voltage.

Controller 40 is coupled with the monitoring circuit 43 and uses the outputted data or signal therefrom to further monitor the electrical characteristic(s) of the electrical energy of the transformer secondary 32 and to control the amount of power which is consumed by one or more of the controllable load(s) 18 as discussed further below. In example details discussed below, controller 40 monitors the voltage of the electrical energy supplied by the transformer secondary to control the power consumption of the loads 18.

Figure 4:
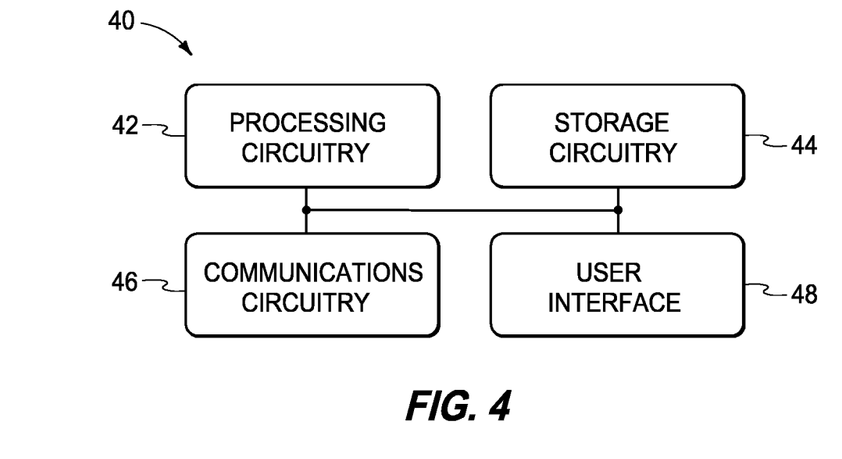
FIG. 4 is a functional block diagram of a plurality of components of a controller according to one embodiment.

Referring to FIG. 4, one embodiment of controller 40 is shown. The depicted controller 40 is implemented as a computer and includes processing circuitry 42, storage circuitry 44, communications circuitry 48 and a user interface 48. Other embodiments of the controller 40 are possible. Controller 40 is configured to implement various methods discussed herein including monitoring electrical energy being conducted within the electrical power system and controlling the amount of electrical energy which is supplied to one or more of the controllable loads which utilize the electrical energy.

Processing circuitry 42 is arranged to process data, control data access and storage, issue commands, and control other desired operations. For example, processing circuitry 42 may monitor electrical energy received from the transformer secondary and control the amount of electrical energy consumed by one or more controllable loads which are coupled with and receive electrical energy from the transformer secondary. A controlled reduction in power flow to one or more of the controllable loads causes an increase in line voltage.

Processing circuitry 42 may comprise circuitry configured to implement desired programming provided by appropriate computer-readable storage media in at least one embodiment. For example, the processing circuitry 42 may be implemented as one or more processor(s) and/or other structure configured to execute executable instructions including, for example, software and/or firmware instructions. Other exemplary embodiments of processing circuitry 42 include hardware logic, PGA, FPGA, ASIC, state machines, and/or other structures alone or in combination with one or more processor(s). These examples of processing circuitry 42 are for illustration and other configurations are possible.

Storage circuitry 44 is configured to store programming such as executable code or instructions (e.g., software and/or firmware), electronic data, databases, and/or other digital information and may include computer-readable storage media. For example, storage circuitry 44 may store information regarding the size of the power requirements of one or more of the controllable loads which receive power from the transformer (e.g., water heater=4 kW, HVAC system=19 kW, EV charger=3.3 to 6.6 kW) and the maximum power rating of the transformer (e.g., 25 kVA). This information may be inputted and stored as part of the setup/configuration process of controller 40 in a particular implementation.

At least some embodiments or aspects described herein may be implemented using programming stored within one or more computer-readable storage medium of storage circuitry 44 and configured to control appropriate processing circuitry 42. The computer-readable storage medium may be embodied in one or more articles of manufacture which can contain, store, or maintain programming, data and/or digital information for use by or in connection with an instruction execution system including processing circuitry 42 in the exemplary embodiment. For example, exemplary computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 46 is arranged to implement communications of controller 40 with respect to external devices, such as monitoring circuit 43 and controllable loads 18. For example, communications circuitry 46 may be arranged to both output and receive communications of the controller 40. Communications circuitry 46 may include appropriate circuitry for implementing serial (e.g., RS-232, i2s, SPI, etc.), cellular, Bluetooth, WIFI, and Ethernet communications, and may also be implemented as a network interface card (NIC), serial or parallel connection, USB port, Firewire interface, flash memory interface, or any other suitable arrangement for implementing communications with respect to controller 40. Communications circuitry 46 has output capability for logic and temporal control signals (e.g., pulse width modulated signals for controlling the controllable loads).

User interface 48 is configured to interact with a user including conveying data to a user (e.g., displaying visual images for observation by the user) as well as receiving inputs from the user. User interface 48 may display information regarding the electrical characteristic(s) of electrical energy received from the transformer secondary and the amount of power consumed by one or more loads at previous or present moments in time and receive inputs from a user which may also control the amount of electrical energy which is supplied to one or more controllable loads.

In one embodiment, monitoring circuit 43 (shown in FIG. 3) outputs an analog signal which is indicative of the monitored voltage and the controller 40 may include an analog-to-digital converter (not shown) to enable digital processing and storage of the signal received from monitoring circuit 43.

As mentioned above, the amount of loading or power being supplied by the transformer secondary affects voltage on transformer secondary. In particular, the voltage decreases as the amount of loading increases (i.e., the amount of load receiving electrical energy from the electric power system 10) and the line voltage of the secondary and power consumption from the transformer secondary have been observed to be linearly related due to the transformer's series impedance. In some embodiments, controller 40 is configured to monitor the voltage of the electrical energy being conducted via the transformer secondary to determine information regarding a linear relationship of an electrical characteristic of the electrical energy, such as voltage, being supplied via the transformer secondary with respect to the amount of power being supplied by the transformer secondary. The controller 40 is also configured to generate a reference value of the electrical characteristic which corresponds to a known amount of power being supplied or delivered by the transformer secondary at a moment in time. In one embodiment discussed below, a No Load voltage may be used when the amount of transformer loading is reduced or minimal.

The controller 40 is further configured to monitor the electrical characteristic of the electrical energy in real time to determine values of the electrical energy at plural moments in time as electrical energy is being supplied to at least one load from the transformer secondary and to adjust an amount of electrical energy which is supplied to at least one of the controllable loads using the information regarding the relationship mentioned above, the reference value of the electrical characteristic and the corresponding real time monitored values of the electrical characteristic.

The controller 40 accesses and uses the information regarding the relationship of the electrical characteristic and the amount of power being supplied by the transformer secondary as well as the reference value as a linear approximation of the transformer loading in the example embodiment. In particular, the relationship of the change of the electrical characteristic (e.g., voltage) with respect to the change in the amount of power supplied (i.e., slope) and the reference value of the electrical characteristic (i.e., point) are used as a linear approximation of the transformer loading along with real time data of the electrical characteristic of the electrical energy being supplied to one or more loads by the controller 40 to control and adjust the amount of electrical energy and power which is supplied from the system 10 to one or more of the loads which are coupled with the transformer secondary in one embodiment.

In one embodiment, the controller 40 uses the real time monitored values of the electrical characteristic of the transformer secondary and the linear approximation of the transformer loading (including the reference voltage and the information regarding the relationship of the electrical energy characteristic versus power) to determine transformer loading information at a plurality of respective moments in time corresponding to the timing of the real time monitored values of the electrical characteristic. In one embodiment, the transformer loading information is used by the controller 40 to adjust an amount of electrical energy which is utilized by at least one of the controllable loads which is coupled with the transformer secondary as discussed in detail below.

In one embodiment, controller 40 controls an adjustment of the loading of the transformer secondary (for example by adjusting the amount of electrical energy and power supplied to one or more of the controllable loads) to generate the information regarding the relationship of the electrical energy characteristic and the amount of power being supplied by the transformer secondary. In this example, the controller 40 measures an electrical characteristic (e.g., voltage) of the electrical energy being supplied by the transformer secondary at a first moment in time while a controllable load is in an off state. Thereafter, the controller 40 controls the controllable load to change state (e.g., off to on) to adjust the amount of electrical energy which is supplied to the controllable load from the transformer secondary and which causes the line voltage of the transformer secondary to drop proportionally to the amount of power supplied to the controllable load. The line voltage of the transformer secondary is measured again while the controllable load is in the on state and consuming electrical energy. The controller 40 uses the change in voltage (dV) before and after the state change of the controllable load and the corresponding change in power (dP) being supplied by the transformer secondary to the controllable load (e.g., which is known from the rated amount of power consumption of the controllable load which changed state) to determine the relationship (e.g., slope) of the electrical energy characteristic and the amount of power being supplied by the transformer secondary (i.e., Delta Power/Delta Voltage or dP/dV) in one embodiment. In some implementations, measured voltage changes were approximately 4 kW/VAC when using a 120 VAC AC voltage measurement point as the line voltage or approximately 2 kW/VAC when using a 240 VAC AC voltage measurement point as the line voltage.

In some embodiments, the voltage measurement of the transformer secondary line voltage during the transitions of the controllable load between states occur prior to and shortly after the controllable load changes state. The amount of time between each measurement should be relatively short with respect to the timing of the change of state of the controllable load to reduce the chances that the line voltage would be impacted by another event (e.g., another load coupled with the transformer secondary also changing state or a distribution network tap changer being changed) and thereby increasing the accuracy of the change in voltage measurement with respect to only the controllable load changing state.

In addition, the timing of the voltage measurements may be based upon different amounts of time after a change of state of the controllable load to allow the line voltage to stabilize for accurate measurement. Furthermore, the measurements before and after the change of state of the controllable load which are used to determine the relationship of the electrical energy characteristic and the amount of power being supplied by the transformer secondary may be repeated and averaged to reduce measurement noise.

As mentioned above, the controller 40 is also configured to determine a reference value (point) of the monitored electrical characteristic of the electrical energy of the transformer secondary in one implementation. For example, in one embodiment, the controller 40 may monitor the electrical characteristic of line voltage of the transformer secondary at a plurality of moments in time when none of controllable loads are on and select an extreme one of the corresponding values of the line voltage as the reference value which is used for power management operations in one embodiment (e.g., the highest line voltage monitored corresponds to a No Load voltage which is indicative of a minimal loading of the transformer secondary or minimal amount of power being supplied by the secondary of the transformer). More specifically, the line voltage of the transformer secondary is greatest when there is no power being supplied to the loads and the line voltage of the transformer secondary drops as power is supplied to one or more loads. In this example embodiment, the amount of power being supplied to non-controllable loads (e.g., lights, clocks, etc.) is assumed to be relatively small compared with the loads being controlled that cause transformer overloading especially in consideration of the recent transition to residential and commercial LED lighting systems.

In one embodiment, the relationship of the voltage and power being supplied (dP/dV) and the reference value (No Load voltage measurement of the transformer secondary) is performed periodically to compensate for changes in the line voltage of the transformer secondary from load consumption changes, changes in tap-changer settings at the distribution network level, and/or changes resulting from different amounts of solar power generation or other reasons.

In some embodiments, the line voltage of the transformer secondary may be periodically monitored when the controllable loads are off to identify times of day for determination of the No Load voltage when the line voltage is highest and therefore more closely approximates the actual No Load voltage even if multiple residences receive electrical energy from the same transformer. Thereafter, the controller may measure the line voltage of the transformer secondary once or a plurality of times at the identified times to determine the No Load voltage for subsequent use as the reference value in the linear approximation of the transformer loading in one implementation as described further below.

A voltage of the electrical energy being conducted using the transformer primary may vary over time causing variations in the line voltage of the transformer secondary. The line voltage upon the transformer secondary may further vary over time due to thermal effects. In one embodiment, controller 40 is configured to determine both the relationship of the electrical energy characteristic and the amount of power being supplied by the transformer secondary (dP/dV) and the reference value of the line voltage upon the transformer secondary at a plurality of moments in time of the day to provide linear approximations of transformer loading over the course of the day of increased accuracy by accounting for changes in the line voltage over time. In addition, the measurements and calculations described above may be repeated and averaged at the different times of day in some implementations.

Controller 40 uses the linear approximation of the transformer loading including the previously-determined slope (dP/dV) and reference value (No Load voltage) of the line voltage along with real time monitoring of the line voltage of the transformer secondary to determine the transformer loading in real time and implement load control operations in response thereto including adjustment of the amount of electrical energy which is supplied to one or more of the controllable loads in real time to mitigate transformer overload and maintain operation of the transformer below its maximum power rating, for example which may be stored in the storage circuitry.

In one embodiment, the controller 40 implements the real time monitoring of electrical energy being supplied by the transformer secondary by monitoring and determining the line voltage at a plurality of moments in time. The real time determined values of the line voltage and the linear approximation discussed above, including the slope (dP/dV) and reference value (No Load voltage), are utilized to determine the amount of power which is being supplied by the transformer secondary to the loads (i.e., transformer loading) at a plurality of respective moments in time. In one more specific implementation, the slope of the linear approximation of the transformer loading is multiplied by the difference between the No Load voltage of the transformer secondary and the real time measurement of the line voltage of the transformer secondary to determine the transformer loading at the given moment in time.

If the determined transformer loading at the given moment in time exceeds the nameplate power rating for the transformer, the controller may utilize various methods to reduce the amount of electrical energy (and power) supplied to the loads and the transformer loading. For example, the provision of electrical energy to one or more controllable loads may be controlled to be delayed until the transformer loading falls to an acceptable level. Reduction of overloading of the transformer may be achieved by shifting the utilization of electrical energy by one or more controllable loads to times when the transformer loading is within its operating limits.

In one more specific example, an EV charging station may be charging an electric vehicle when an HVAC system cycles from an off to an on state. If the transformer loading is exceeded by the provision of electricity to the HVAC system along with the EV charging station, the controller may cease or reduce the rate of charging of the electric vehicle (i.e., a controllable load) until the HVAC system cycles off.

As mentioned above, the power requirements of the different loads receiving electricity from the transformer secondary may be stored in the storage circuitry. When the transformer is overloaded, the controller may use the real time determined amount of amount of excess loading above the nameplate rating and the stored power requirements of the controllable loads to select one or more of the controllable loads to receive a reduced amount or no electrical energy in one embodiment to alleviate the overloaded transformer. In one example, the controllable load(s) to be curtailed are selected to provide a reduction of the transformer loading below the transformer power rating and an increase in the line voltage. In one example, it is desired to maintain the line voltage of the transformer secondary within a threshold amount (e.g., 5 Volts) of its designed operational voltage (e.g., a line voltage at or above 235 VAC for a transformer secondary which is designed to supply electrical energy having a voltage of 240 VAC).

Once the transformer loading has dropped to an acceptable level or threshold, the controllable loads which received a reduced amount of electrical energy may again be controlled to return to operation with increased usage of electricity. In one example, the controller outputs a signal instructing the EV charging station to resume charging or increase the rate of charging.

Accordingly, in one embodiment, the controller reduces the amount of electrical energy which is utilized by one or more of the controllable loads as a result of the determined transformer loading information indicating that the transformer secondary is supplying an amount of power to the loads which exceeds the power rating for the transformer.

In one embodiment, a history of the determined values of the line voltage and/or transformer loading may be stored over time during use of the controller and the values may be used to implement subsequent control strategies for load operation and curtailment. For example, common times of the day may be identified when the line voltage is typically relatively high (and transformer loading is relatively low) and these times may be utilized to schedule EV charging or other load usage.

Example embodiments discussed above are directed towards reducing the amount of power being supplied by the transformer secondary and increasing the line voltage as a result thereof. In another example, it may be desired to increase loading of the transformer secondary to reduce the line voltage. For example, one or more renewable generation sources, such as a wind generation system and/or photovoltaic system, may also be coupled with the transformer secondary and supply electrical energy thereto, in addition to the electrical energy received from the transformer primary, which may cause the line voltage of the transformer secondary to rise. In this situation, the controller may control one or more of the controllable loads (e.g., EV charging station, water heater) to increase usage of electrical energy, for example, by turning one or more load from an off state to an on state which causes the line voltage to fall.

An example of monitoring and control operations of the controller with respect to loading of a transformer secondary is described below. In this example, a residence has a single controllable load of 6.6 kW in the form of an electric vehicle charger, the transformer has a rating of 25 kVA, the No Load voltage is 120 VAC and the point of measurement of the line voltage is on the 120 VAC lines, and the relationship dP/dV is 4 kW/VAC. The values of the calculated total transformer load using the linear approximation of the transformer loading along with the power usage of an EV charging station controllable load are shown in Table A at a plurality of sequential moments in time.

TABLE A

| No-Load Voltage | Line Voltage | Electric Vehicle Charging Load | Calculated Transformer Load |
|---|---|---|---|
| 120 VAC | 119 VAC | 0 kW | 4 kW |
| 120 VAC | 115 VAC | 0 kW | 20 kW |
| 120 VAC | 112 VAC | 6.6 kW | 32 kW |
| 120 VAC | 113.65 VAC | 0 kW | 25.4 kW |

In this example, one or more non-controllable load of approximately 4 kW is initially receiving power and thereafter another non-controllable load consumes additional power raising the calculated load to 20 kW. Thereafter, the EV charging station begins charging and due to the number of loads being supplied by this transformer, the line voltage of the secondary transformer dropped to 112 VAC and caused the calculated transformer load of 32 kW to be greater than the transformer nameplate rating of 25 kVA. The controller thereafter stops the EV charging which causes the line voltage of the transformer secondary to increase by approximately 1.6 VAC and the calculated transformer loading to decrease to approximately 25.4 kW which is significantly closer to the transformer nameplate rating and reduces transformer degradation due to overheating.

A key indicator of the grid's capability to supply loads is the grid frequency. Since electrical power grid systems may have little to no energy storage capability, grid frequency directly represents the balance between load and generation. If generation is greater than load, frequency will increase and if generation is less than the load, frequency will decrease. Typical grid control methodologies are primarily focused at using generation sources at a variety of locations to maintain frequency within acceptable conditions. Aspects of the disclosure discussed herein with respect to control of loads based upon transformer loading may be used alone or in combination with other frequency and voltage control strategies.

For example, in addition to the line voltage monitoring and load control operations described above, the controller may also access information regarding frequency of the electrical energy being conducted within the electric power system 10 and may control one or more controllable loads to consume increased or decreased power as a result of the frequency being greater or less than a nominal value, respectively. For example, the controller may monitor the frequency of the electrical energy conducted using the transformer secondary or access information regarding the frequency directly from the utility operating the electric power system 10. The adjustment of the amount of electrical energy which is consumed by one or more loads based upon frequency monitoring attempts to balance the amount of electrical energy being consumed with respect to the amount of electrical energy being produced in one embodiment.

In example embodiments, the aspects of the disclosure directed to transformer loading may be applied at the distribution network level of the electric power system while other control strategies, such as for monitoring and controlling frequency, may be implemented at both the transmission network and distribution network levels of the electric power system.

Transformers typically supply electricity to a number of houses or residences and at least some aspects of the disclosure enable loads to be controlled within a single residence to reduce transformer loading without need for communications between houses. In addition, transformer loading and monitoring may be implemented without the use of relatively expensive power monitoring equipment.

Electric power systems also use voltage regulators or voltage tap changers which are electro-mechanical devices designed to maintain feeder voltage within the voltage specifications. The service life of these devices is limited by the number of times the tap changer changes position. Operationally, these tap changers are electro-mechanical devices that simply change the turns-ratio of a transformer to increase or decrease the downstream voltage. All approaches that minimize tap-changer operation such as shifting loads based on measured line voltage discussed herein extends the life of these devices and therefore reduces the system operational costs.

The monitoring and control of transformer loading described herein enable the transformer to be operated in accordance with appropriate temperature specifications and increases the life of the transformer. The monitoring and control of transformer loading discussed above may be utilized in various applications to increase transformer life. For example, the loading of the transformer secondary may be monitored to determine available capacity and adjust the timing of charging of a fleet of electric vehicles from simultaneous charging to charging of different ones of the vehicles over a period of time before the vehicles are again needed for use to reduce the occurrence of transformer overloads. The controller measures the line voltage of the electrical energy supplied to the charging station to determine the line voltage while charging at maximum rate and at minimum rate to determine the linear approximation of transformer loading as described above and the real time line voltage is used with the linear approximation to generate a control signal from the controller which can be changed to adjust the power drawn by the electric vehicle charging system responsive to the determined transformer loading.

Typical HVAC thermostats are powered through a 24 VAC transformer which is directly connected to the line voltage. In one embodiment, the controller measures the 24 VAC supplied to the thermostat to infer the line voltage while the HVAC is operating and not operating to determine transformer loading from the HVAC system. The monitored line voltage and linear approximation may be used to reduce the amount of power supplied to the HVAC system (e.g., resistive heating system) to ease transformer loading. In some examples, the operation of the HVAC system or EV charging may be delayed until a period of time when the transformer loading decreases to implement load shifting.

In another example, the line voltage supplied to the water heater can be monitored while the water heater is operating and not operating to calculate transformer loading from the water heater. The power used by the water heater system can be shifted by the controller to ease transformer loading in another application.

The controller and transformer loading control aspects discussed herein may also be used for distributed transformer load monitoring and control. In one example, two equally equipped homes are connected to the same residential 25 kVA transformer and each include loads of a 6.6 kW electric vehicle charger, 19 kW resistive HVAC system and 4 kW water heater. These loads are controllable in only one of the homes. If all loads were simultaneously being supplied to both homes, the 25 kVA transformer would be supplying ~60 kVA of loads and would be very overloaded. The home with controllable loads can monitor the transformer secondary voltage and shift the water heater and electric vehicle charging to times when the HVAC system is not operating and reduce over 10 kW peak load from the transformer. With additional control, the 19 kW resistive heating system can monitor the transformer secondary voltage to turn its resistive heaters ON during times when the non-controlled home is not heating and reduce the total transformer loading by another 19 kW. These examples of simple shifts in power demand may be implemented to significantly reduce transformer loading and extend transformer life. Additionally, aspects of embodiments described herein do not require sensors on the transformer to be protected and may operate autonomously to monitor the line voltage and implement load shifting without external communications with other residences.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A transformer power management controller comprising:
    processing circuitry configured to:
        access a reference value of an electrical characteristic of electrical energy at a secondary of a transformer of an electric power system and which corresponds to a known amount of power which is being supplied by the secondary of the transformer;
        access a relationship between the electrical characteristic and an amount of power being supplied by the secondary of the transformer;
        access another value of the electrical characteristic at a moment in time when the electrical energy is being supplied to at least one load which is coupled with the secondary of the transformer;
        use the reference value as a point of a linear approximation of loading of the transformer and the relationship as a slope of the linear approximation of loading of the transformer;
        use the reference value, the relationship, the another value and the liner approximation to adjust an amount of the electrical energy which is supplied by the secondary of the transformer to the at least one load which is coupled with the secondary of the transformer; and
        determine the reference value and the relationship prior to the accessing the another value of the electrical characteristic.

2. A transformer power management controller comprising:
    processing circuitry configured to:
        access a reference value of an electrical characteristic of electrical energy at a secondary of a transformer of an electric power system and which corresponds to a known amount of power which is being supplied by the secondary of the transformer;
        access a relationship between the electrical characteristic and an amount of power being supplied by the secondary of the transformer;
        access another value of the electrical characteristic at a moment in time when the electrical energy is being supplied to at least one load which is coupled with the secondary of the transformer;
        determine a plurality of additional values of the electrical characteristic at a plurality of additional moments in time when the electrical energy is being supplied to at least one load which is coupled with the secondary of the transformer; and
        use the reference value, the relationship, the another value, and the additional values to adjust an amount of the electrical energy which is supplied by the secondary of the transformer to at least one load which is coupled with the secondary of the transformer at a plurality of respective moments in time.

3. The transformer power management controller of claim 2 wherein the processing circuitry is configured to control an adjustment of loading of the secondary of the transformer to generate the relationship.

4. The transformer power management controller of claim 3 wherein the processing circuitry is configured to use values of the electrical characteristic before and after the adjustment of the loading of the secondary of the transformer to generate the relationship.

5. The transformer power management controller of claim 2 wherein the processing circuitry is configured to select an extreme one of the additional values of the electrical characteristic as the reference value.

6. The transformer power management controller of claim 5 wherein the extreme one of the values corresponds to minimal loading of the secondary of the transformer.

7. The transformer power management controller of claim 2 wherein the processing circuitry is configured to determine an amount of power which is being supplied by the secondary of the transformer at the moment in time using the reference value of the electrical characteristic, the relationship, and the another value of the electrical characteristic.

8. The transformer power management controller of claim 2 wherein the processing circuitry is configured to use a maximum power rating of the transformer to adjust the amount of the electrical energy which is supplied by the secondary of the transformer.

9. The transformer power management controller of claim 2 wherein the reference value is accessed during a no-load condition at the secondary of the transformer, and wherein the relationship is predetermined and relates a change in the electrical characteristic with a corresponding change in the amount of power supplied by the secondary of the transformer.

10. The transformer power management controller of claim 2 wherein the reference value is constant.

11. The transformer power management controller of claim 2 wherein the processing circuitry is configured to control the amount of power which is supplied by the secondary of the transformer to determine the reference value of the electrical characteristic.

12. The transformer power management controller of claim 2 wherein the processing circuitry is configured to control the amount of electrical energy supplied by the secondary of the transformer at a plurality of moments in time to determine the relationship between the electrical characteristic and the amount of power.

13. The transformer power management controller of claim 2 wherein the processing circuitry is configured to use the reference value as a point of a linear approximation of loading of the transformer and the relationship as a slope of the linear approximation of the loading of the transformer, and the processing circuitry is configured to use the linear approximation to adjust the amount of the electrical energy which is supplied by the secondary of the transformer.

14. The transformer power management controller of claim 2 wherein the processing circuitry is configured to determine the reference value and the relationship before the moment in time of the accessing of the another value of the electrical characteristic and before the additional moments in time.

15. The transformer power management controller of claim 2 wherein the processing circuitry is configured to use a maximum power rating of the transformer to adjust the amount of the electrical energy which is supplied by the secondary of the transformer, and wherein the reference value is accessed during a no-load condition at the secondary of the transformer, and wherein the relationship is predetermined and relates a change in the electrical characteristic with a corresponding change in the amount of power supplied by the secondary of the transformer.

16. A computer-implemented transformer power management method comprising:

using a secondary of a transformer of an electric power system, supplying electrical energy to a plurality of loads which are coupled with the secondary of the transformer;

adjusting an amount of the electrical energy which is supplied to one of the loads to determine a relationship between a change in voltage of the electrical energy being supplied by the secondary of the transformer and a change in power being supplied by the secondary of the transformer;

monitoring the voltage of the electrical energy being supplied by the secondary of the transformer to determine a reference value of the voltage of the electrical energy being supplied and which corresponds to a known amount of power being supplied by the secondary of the transformer;

monitoring the voltage of the electrical energy to determine another value of the voltage at a moment in time while the secondary of the transformer is supplying the electrical energy to at least one of the loads;

using the relationship between the change in voltage and the change in power, the reference value and the another value, determining an amount of power which is being supplied by the secondary of the transformer to the at least one of the loads at the moment in time;

using the determined amount of power, reducing the amount of the electrical energy which is supplied by the secondary of the transformer to the at least one of the loads; and wherein the monitoring of the voltage of the electrical energy to determine the another value occurs after the monitoring of the voltage to determine the reference value and after the determination of the relationship.

17. The computer-implemented transformer power management method of claim 16 further comprising accessing a maximum power rating of the transformer, and wherein the reducing comprises reducing the amount of power which is being supplied by the secondary of the transformer to an amount which is below the maximum power rating for the transformer.

18. The computer-implemented transformer power management method of claim 16 wherein the relationship is determined without the reference value and without the another value.

19. The computer-implemented transformer power management method of claim 16 further comprising controlling the adjustment of the amount of the electrical energy which is supplied to the one load to determine the relationship.

\* \* \* \* \*